(No Model.)
W. C. HALE.
MILLSTONE DRIVER.
No. 285,613. Patented Sept. 25, 1883.
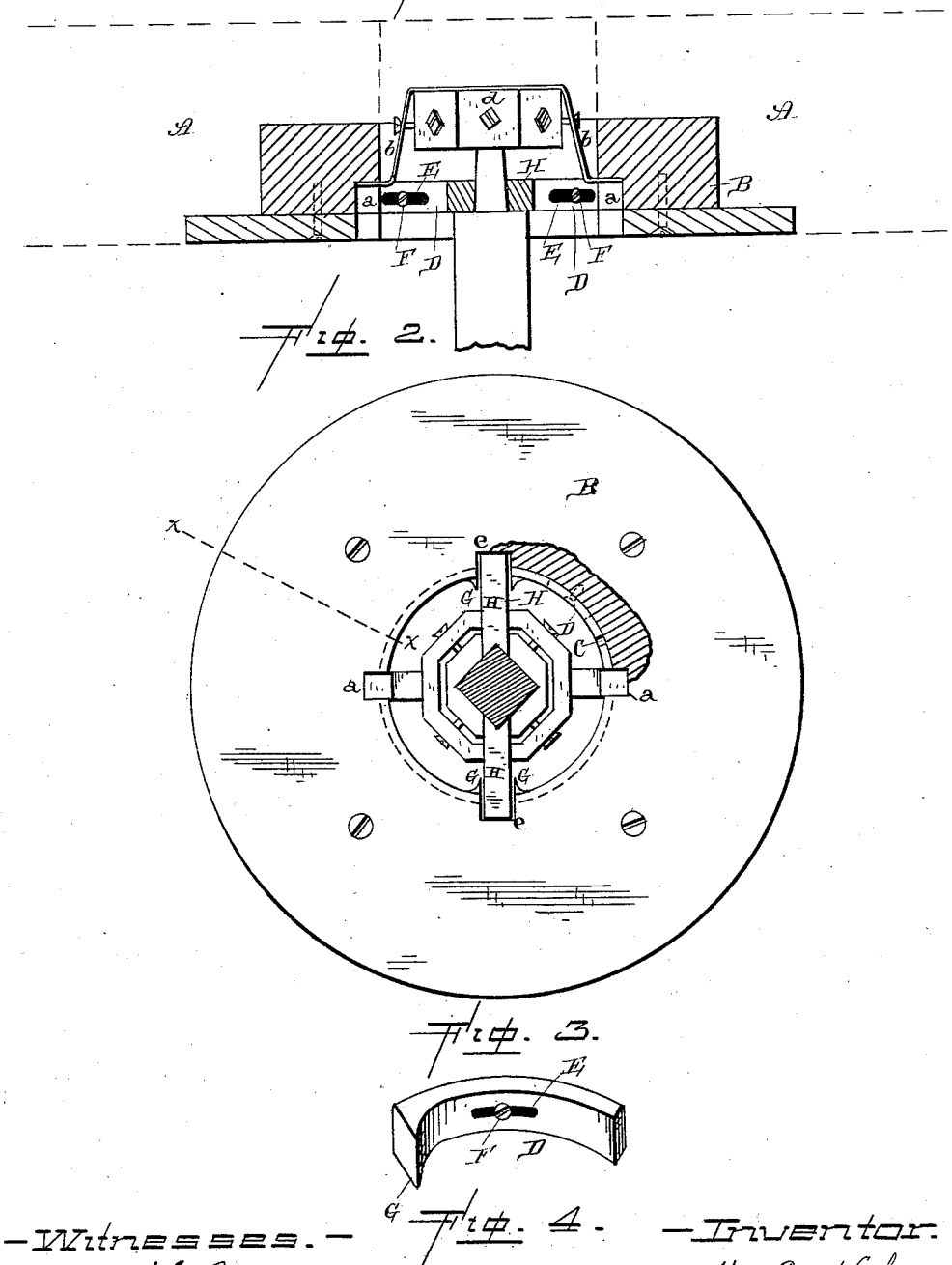
Witnesses.
Louis F. Gardner
J. W. Garner
Inventor.
W. C. Hale
per
J. A. Lehmann,
Atty.
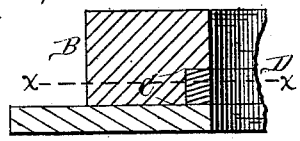

UNITED STATES PATENT OFFICE.

WILLIAM CARTER HALE, OF AUSTIN SPRINGS, TENNESSEE.

MILLSTONE-DRIVER.

SPECIFICATION forming part of Letters Patent No. 285,613, dated September 35, 1883.

Application filed May 22, 1883. (No model.)

*To all whom it may concern:*

Be it known that I, WILLIAM C. HALE, of Austin Springs, in the county of Washington and State of Tennessee, have invented certain new and useful Improvements in Millstone-Drivers; and I do hereby declare the following to be a full, clear, and exact description of the invention, such as will enable others skilled in the art to which it pertains to make and use it, reference being had to the accompanying drawings, which form a part of this specification.

My invention relates to an improvement in millstone-drivers; and it consists in the combination of the millstone, the cast-iron head secured therein, the adjustable slotted slides, and the driver, the parts being arranged to operate substantially as described.

The objects of my invention are to combine with the runner-stone the driver, the head, and suitable adjusting devices for the purposes of adjusting the stone centrally on the spindle, causing it to run easily and well balanced, and taking up wear between the driver and the head.

Figure 1 is a vertical section of my invention, the balance-rynd being shown in side elevation. Fig. 2 is an inverted plan view of the head, driver, balance-rynd, &c., a portion of the head being shown in section. Fig. 3 is an enlarged perspective of one of the slides. Fig. 4 is an enlarged vertical section of a portion of the cast head, taken on the lines $x$ $x$ of Fig. 2.

A represents the millstone, in the center of the under side of which is placed a cast-metal annular head, B. In this head is made a suitable opening, to receive the upper part of the spindle, the driver, and balance-rynd. This head is also provided with suitable recesses, $a$, upon opposite sides, to receive the arms $b$ of the balance-rynd $d$. The driver H is placed upon the spindle in the usual manner, its ends projecting into suitable recesses, $e$, made in opposite sides of the opening in the center of the head. In this cast-iron head B are made suitable grooves, C, in which the slides D are placed. These slides are provided with slots E, and are held in place by means of the set-screws F, which pass through the slots in the slides into the head. These slides are adjustable endwise in the grooves C, and are made to approach opposite sides of the ends of the driver. The slides D are made adjustable back and forth in the grooves in the head for the purposes of securing the concentricity of the stone and spindle, and taking up any wear between the driver and the head, and the ends of the slides are enlarged, as shown at G, for the purpose of forming a larger bearing-surface against the sides of the driver than would be formed if the slides were of the same thickness throughout their length. By means of these slides the spindle and stone can be trued, and wear can be taken up at any time and thus cause the stone to be rigidly secured to the driver, so as to have no independent movement of its own. The power is applied through the driver from both ends at once, and thus a perfectly even and regular rotation of the stone is secured.

By means of the construction above described, the adjustment of the stone is easily effected, wear compensated for, and the parts securely held in place.

Having thus described my invention, I claim—

The combination of the millstone, the cast-iron head secured therein, the adjustable slotted slides D, and the driver H, the parts being arranged to operate substantially as shown.

In testimony whereof I affix my signature in presence of two witnesses.

WILLIAM CARTER HALE.

Witnesses:
W. V. DENNETT,
G. F. GAMMON, Jr.